May 2, 1950     G. C. MAXWELL ET AL     2,506,274
ROPE FASTENING DEVICE
Filed Nov. 1, 1945
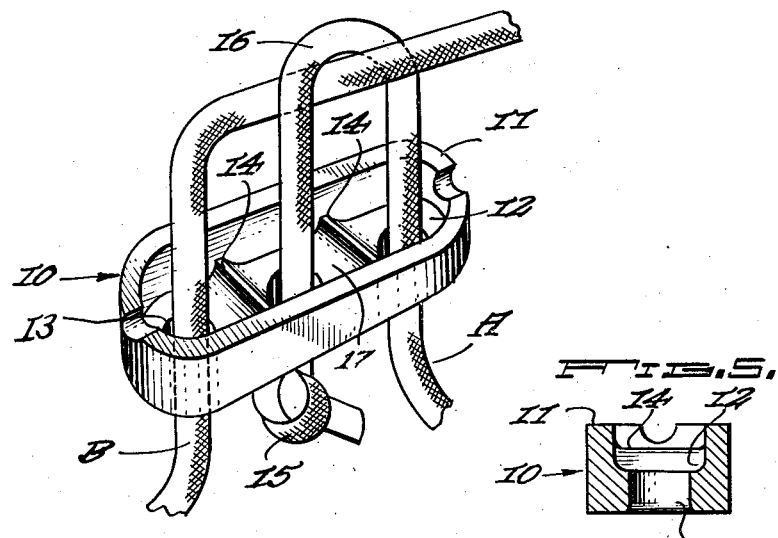
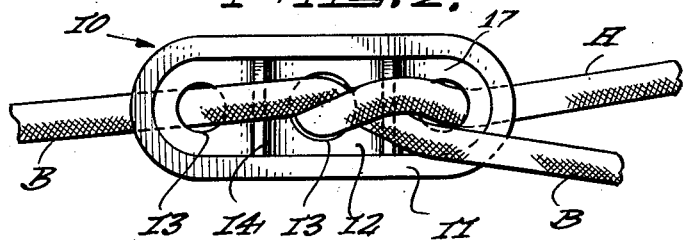
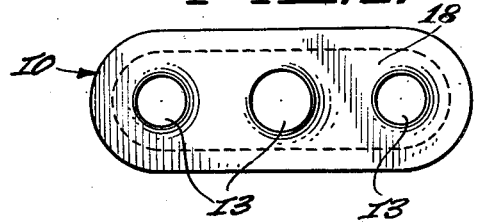
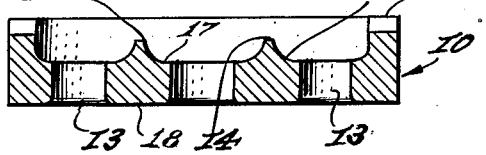
INVENTORS,
GROVER C. MAXWELL & OSCAR C.
BUCHHOLTZ
BY Clark & Ott
ATTORNEYS, Patented May 2, 1950

2,506,274

UNITED STATES PATENT OFFICE 2,506,274

ROPE FASTENING DEVICE

Grover C. Maxwell and Oscar C. Buchholtz, Maspeth, N. Y.

Application November 1, 1945, Serial No. 626,022

1 Claim. (Cl. 24—129)

This invention relates to rope fastening devices and the invention has particular reference to an improved device of said character for coupling the ends of ropes together in a manner to preclude relative separation thereof while avoiding rubbing or cutting of the rope ends and which may be readily loosened or disconnected irrespective of whether the rope ends are in a wet or dry condition.

The invention has in view a rope fastening device formed with spaced openings and transversely extending ribs disposed between adjacent openings through which openings the ribs are reeved for coupling the same together by the formation of a loop in one of the ends thereof engaging over the other rope end to thereby compress the same against the upstanding rib so as to grippingly retain the rope ends in coupled engagement.

The invention further comprehends a rope fastening device of the indicated character in which the spaced openings are formed in a central portion surrounded by a peripheral rim for producing a bight about one of the rope ends to thereby compress the same into engagement with the transversely extending ribs located within the confines of the rim and with one of the rope ends protruding over the rim so as to engage about the said bight for preventing relative separation of the rope ends.

With the foregoing and other objects in view reference is now made to the following specification and accompanying drawings in which is illustrated the preferred embodiment of the invention.

In the drawings:

Fig. 1 is a perspective view of a rope fastening device constructed in accordance with the invention and illustrating the manner of attaching the rope ends thereto before the same are drawn tight.

Fig. 2 is a top plan view thereof with the rope ends drawn tight.

Fig. 3 is a bottom plan view of the rope fastening device.

Fig. 4 is a longitudinal vertical sectional view therethrough.

Fig. 5 is a transverse medial vertical sectional view.

Referring to the drawings by characters of reference, the rope fastening device includes a body 10 fashioned of metal or other suitable material such as glass, porcelain, synthetic plastics and the like and which is of elongated formation with rounded opposite ends and formed with a recess in the upper face thereof to thereby provide an upstanding peripheral rim 11 surrounding a depressed central portion 12.

The central portion 12 is formed with parallel upper and lower faces 17 and 18, the lower face 18 lying in the same plane with the lower face of the rim 11 and the same is provided with a plurality of aligned horizontally spaced apertures 13, three being shown in the embodiment illustrated which open through the upper and lower faces thereof. The apertures 13 may be of any preferred size to slidably receive a rope end therethrough irrespective of whether or not the rope is in a wet or dry condition. The endmost apertures 13 are located adjacent the rim 11 at the opposite ends of the body 10 while the intermediate aperture is located substantially at the center thereof.

In order to provide means for positively gripping the rope ends for preventing relative separation thereof, the upper face of the recessed portion 12 is formed with longitudinally spaced transversely extending ribs 14 respectively located between adjacent apertures 13 with the top of the ribs being disposed below the top of the rim 11.

The fastening device is adapted to secure a pair of rope ends together or the end of one rope to another rope. As illustrated, one of the rope ends indicated by the reference character A is reeved upwardly through one of the end-most apertures 13 and thence downwardly through the central aperture with the free end of the rope knotted beneath the body 10 as at 15 to prevent retraction of the rope through the apertures and to provide a loop or bight 16 in the portion of the rope between the apertures and within the confines of the rim and overlying one of the ribs 14. The other rope end indicated by the reference character B is reeved upwardly through the opposite endmost aperture 13 and thence through the loop or bight 16 and upwardly about the side of the loop or bight and over the rim 11. Tightening of the rope ends causes the loop 16 to compress the portion of the rope end B protruding through the loop downwardly into impinging relation with one of the ribs 14 and the tighter the pull on the rope end A the greater will be the compression against the rope end B into impinging relation with the rib 14. Similarly the greater the tension applied to the rope end B the greater will be the compression of the same against the opposite rib 14.

Constructed in this manner there is provided a rope fastening device which may be readily utilized for fastening a pair of rope ends together which eliminates sliding or relative separation of the ropes while the ropes may be readily disconnected therefrom if desired and which may be used for nautical purposes, clotheslines, awnings and the like.

What is claimed is:

A rope fastening device including an elongated body consisting of a bottom wall having parallel upper and lower faces, upstanding wall portions extending along the opposite longitudinal side edges of said bottom wall and projecting above the upper face thereof, said bottom wall having three longitudinally aligned circular apertures opening through the opposite faces thereof and spaced from said upstanding wall portions with the intermediate aperture located centrally of the bottom wall, and an upstanding rib located on each side of the intermediate aperture between the same and the end apertures and extending transversely between said opposite upstanding wall portions in parallel relation on the upper face of the bottom wall with the top of the ribs disposed below the top of the upstanding wall portions for receiving through said apertures the ends of the ropes to be fastened together and compressed against said ribs by the tightening of the rope ends.

GROVER C. MAXWELL.
OSCAR C. BUCHHOLTZ.

REFERENCES CITED

The following references are of record in the file of this patent:

UNITED STATES PATENTS

| Number | Name | Date |
|---|---|---|
| 59,277 | Sawyer | Oct. 30, 1866 |
| 215,302 | Snowden | May 13, 1879 |
| 612,636 | Zusi | Oct. 18, 1898 |
| 786,744 | Fleenor | Apr. 4, 1905 |
| 872,355 | Le Maire | Dec. 3, 1907 |
| 1,665,531 | Cole | Apr. 10, 1928 |